United States Patent Office 2,870,202
Patented Jan. 20, 1959

2,870,202

METHOD FOR THE OBTENTION OF CALCIUM TARTRATE

Elso Petrich, Maipu-Mendoza, Argentina

No Drawing. Application January 17, 1956
Serial No. 559,515

6 Claims. (Cl. 260—536)

The present invention relates to a method for producing calcium tartrate in certain by-products from the production of wine such as, more particularly wine pulp, dregs and tartar.

Heretofore calcium tartrate has been produced by subjecting first the material to digestion with a certain amount of hot water so as to solubilize the entire bitartrate contents, whereby a semiliquid mud-like mass is formed which is subjected to decantation. Thus, a relatively clear acid liquid is obtained which is neutralized with the aid of lime leach and by adding gypsum and/or calcium chloride.

This method required the use of a relatively large amount of water in order to achieve the total dissolution of the bitartrate while the temperature of the mass must be maintained during the decantation in order to avoid recrystallisation thereof. Such a method further requires the use of large containers because the decantation is very slow. Furthermore as a result of the technique employed, heavy losses are caused by the high amount of waste muds and the high degree of moisture contained therein. In addition to all this, there is the fact that dissolution will hardly be complete so that the non-dissolved crystals will be discarded with the mud. On the other hand, a further heavy loss results from the insoluble calcium tartrate which is always present in a relatively high proportion from natural formation in the starting material and which is also allowed to leave the system together with the mud.

It has now been discovered that, contrary to what could be expected on the basis of logical reasoning, it is possible to obtain results which in many ways are greatly superior to the above mentioned conventional methods, if the entire mass formed as digestion product is treated without any previous decantation whilst it contains, even if partially dissolved, the potassium bitartrate and in suspension, the calcium tartrate originally contained in the starting material. Starting from this general principle I have conceived the process of the present invention, which essentially consists in gradually adding lime leach to the whole of said mass, without any prior decantation, that is, in its natural condition as resulting from the process of forming the same, and which contains, at least partly dissolved, the potassium bitartrate and, in suspension, the calcium tartrate originally present in the material, while subjecting such mass to intense agitation; in adding before, during or after the addition of the lime leach a sufficient amount of a calcium salt so as to cause the precipitation of the neutral soluble potassium tartrate; in continuing the intense agitation of the mass under treatment until the calcium tartrate crystals have acquired a size permitting their separation from the mass; and in finally separating said crystals from the remaining suspended matter by means of a wet classification process.

By means of the process of the present invention it is possible to achieve a considerable saving of fuel since the amount and temperature of the water employed in the digestion may be quite small for the reason that, contrary to conventional methods, it is not necessary to dissolve initially all the salts contained in the material treated. Furthermore the use of the additional containers necessary for decantation is avoided, and the time involved in decantation is saved when the process of the present invention is used.

Another important advantage of the invention arises from the fact that all the bitartrate present can be converted to the corresponding calcium salt since the entire material is subjected to reaction.

A further important advantage resides in the fact that, in addition to the calcium tartrate thus obtained, an appreciable amount of said calcium salt originally contained in the material can be recovered in the final step of wet classification.

As a further advantage of the method of the present invention, it may be mentioned that the container or containers, provided with agitators which are necessary for carrying out the digestion, may also be employed in the later reaction stages as reaction vessels.

As another obvious advantage of the method of the present invention, the saving of labour, which results from the simplified procedure, may be mentioned.

Other advantages of the method of the present invention will become evident from the following detailed description thereof.

In order that the present invention be readily understood and can be carried into practice, the following specific example of one embodiment thereof is given. It will be appreciated that the invention is not, however, restricted to the details indicated in such example.

*Example*

The treatment was performed on 1 m.$^3$ of residue taken from a dreg distilling operation and containing 25% of solids comprising a total amount of 50 kg. of potassium bitartrate and 10 kg. of calcium tartrate, at 60° C., while maintaining about 30 kg. of potassium bitartrate in solution, whereby 20 kg. of bitartrate together with said amount of 10 kg. of calcium tartrate remained undissolved. The mass was agitated and a calculated amount of 23 kgs. of commercial calcium sulphate was added. The addition of lime leach in small doses was started immediately and the progress of neutralization was checked by watching the natural color of the mass which slowly turned to a greenish brown as the neutral point was being approached. When the intense agitation was continued the color again turned strongly red as a consequence of the progressive dissolution of the initially non-dissolved portion of bitartrate. The addition of lime leach was continued until the mass assumed the above mentioned greenish brown coloring. When this color remained unchanged after a certain amount of further agitation, the addition of lime leach was discontinued. The agitation, however, was continued for a period of 4 hours whereafter the container was emptied without interruption of the agitation. The contents were discharged in a controlled manner through a conduit through which a controlled flow of water was also directed, such conduit leading to an inclined classifier vessel in the lower portion of which a given constant level was maintained whilst at the bottom the heaviest particles (calcium tartrate and sand) settled and accumulated on the slanting bottom until they projected beyond the level of the liquid where the relatively liquid material (having a moisture content of about 40%) was discharged. Upon drying, 80 kg. of commercial calcium tartrate was obtained which upon analysis was found to have a titer of 87%.

It must be understood that a number of variations fall within the scope of the invention, and among these the following more important features may be mentioned, Referring to the starting material, it should be noted that it is possible to use dry dregs, preferably ground, or alternatively wet pressed lees and in either case the dregs may or may not have been distilled previously. It is also possible to use muddy residual wine as obtained from the leaching of grape skins or pulp, and it is equally possible to treat the tartars deposited in the vats used in wine production which preferably are ground.

The amount and temperature of the water employed in the digestion may vary according to the type and quality of the material used.

The order in which the calcium salts and the lime leach are added may also vary and it does not make any difference if the calcium salts are added before or after the addition of the lime leach.

As regards the calcium salts which may be used in order to complete the reaction, calcium sulphate and/or calcium chloride may be mentioned.

In order to separate the crystals from the remaining materials by means of a wet classification process it is possible to use several suitable methods which are known per se. By way of example, methods based on the different rate of sedimentation of particles entrained in a current of water flowing at constant speed through a container, also filled with water, may be employed and in such method optional use may be made of a system for continuously withdrawing the precipitated material. In such a method, the solid particles entrained in the current of water may be fed to the upper portion of the container where they will meet, during sedimentation and upwardly flowing current of water the speed of which is somewhat greater than that of the sedimenting particles desired to be separated. The particles entrained in the current of water may also be carried to a plain circular tray-like container over the border of which the liquid with the light particles will overflow whilst the heavier particles are deposited on the bottom and continuously carried towards the central portion thereof by means of scraping members so that they can be withdrawn from such central portion by means of a suitable mechanism. Suitable apparatus includes cyclon type classifiers having a static body within which a centrifugal force is exerted on a mass in rapid circular movement, the effect of such force being non-uniform with regard to the particles of the different components, the heavier particles tending to follow a path diverging from that of the liquid and the lighter suspensions, and wherein said heavier particles are withdrawn freely or with the aid of suitable devices continuously or discontinuously. Finally, suitable methods are those based on the known principle of flotation wherein the material desired to be recovered is placed into proper condition by means of the action of gas bubbles so that it is carried to the surface and floats on the top of the turbid aqueous suspension against the force of gravity.

It will be evident that apart from these mentioned, further modifications and alterations or variations may be introduced into the process of the present invention which must be regarded as limited only by the restrictions expressly stated in the annexed set of claims.

What I claim is:

1. A method of producing calcium tartrate comprising the steps of adding lime leach to a mass of untreated acidic fermentation residue obtained in the manufacture of wine and containing potassium tartrate so as to neutralize said mass and to form soluble neutral potassium tartrate therein; also adding to said mass a soluble calcium salt in a quantity sufficient to transform the soluble tartrates into crystallized calcium tartrate thereby forming a reaction mass; agitating said reaction mass until said calcium tartrate crystals have grown to a predetermined size, said predetermined size of said calcium tartrate crystals being so chosen as to permit separation by wet classification of said crystals from the remainder of the mass; and subjecting the mass containing said calcium tartrate crystals of predetermined size to wet classification thereby recovering said crystallized calcium tartrate.

2. A method of producing calcium tartrate comprising the steps of adding gradually and under intense agitation lime leach to a mass of untreated acidic fermentation residue obtained in the manufacture of wine and containing potassium tartrate so as to neutralize said mass and to form soluble neutral potassium tartrate therein; also adding to said mass a soluble calcium salt in a quantity sufficient to transform the soluble tartrates into crystallized calcium tartrate; continuing agitation of the thus-formed reaction mass until said calcium tartrate crystals have grown to a predetermined size, said predetermined size of said calcium tartrate crystals being so chosen as to permit separation by wet classification of said crystals from the remainder of said reaction mass; and subjecting the mass containing said calcium tartrate crystals of predetermined size to wet classification thereby recovering said crystallized calcium tartrate.

3. A method of producing calcium tartrate comprising the steps of forming an aqueous suspension of dry dregs obtained in the manufacture of wine whereby at least a portion of the potassium bi-tartrate contained in said dry dregs is dissolved; adding lime leach to said suspension so as to neutralize the same and to form soluble neutral potassium tartrate therein; also adding to said suspension a soluble calcium salt in a quantity sufficient to transform the soluble tartrates into crystallized calcium tartrate thereby forming a reaction mass; agitating said reaction mass until said calcium tartrate crystals have grown to a predetermined size, said predetermined size of said calcium tartrate crystals being so chosen as to permit separation by wet classification of said crystals from the remainder of the mass; and subjecting the mass containing said calcium tartrate crystals of predetermined size to wet classification thereby recovering said crystallized calcium tartrate.

4. A method of producing calcium tartrate comprising the steps of adding lime leach to a mass of untreated acidic fermentation residue obtained in the manufacture of wine and containing potassium tartrate so as to neutralize said mass and to form soluble neutral potassium tartrate therein; also adding to said mass calcium sulphate salt in a quantity sufficient to transform the soluble tartrates into crystallized calcium tartrate thereby forming a reaction mass; agitating said reaction mass until said calcium tartrate crystals have grown to a predetermined size, said predetermined size of said calcium tartrate crystals being so chosen as to permit separation by wet classification of said crystals from the remainder of the mass; and subjecting the mass containing said calcium tartrate crystals of predetermined size to wet classification thereby recovering said crystallized calcium tartrate.

5. A method of producing calcium tartrate comprising the steps of adding lime leach to a mass of untreated acidic fermentation residue obtained in the manufacture of wine and containing potassium tartrate so as to neutralize said mass and to form soluble neutral potassium tartrate therein; also adding to said mass calcium chloride salt in a quantity sufficient to transform the soluble tartrates into crystallized calcium tartrate thereby forming a reaction mass; agitating said reaction mass until said calcium tartrate crystals have grown to a predetermined size, said predetermined size of said calcium tartrate crystals being so chosen as to permit separation by wet classification of said crystals from the remainder of the mass; and subjecting the mass containing said calcium tartrate crystals of predetermined size to wet classification thereby recovering said crystallized calcium tartrate.

6. A method of producing calcium tartrate comprising the steps of adding under stirring about 23 parts of calcium sulphate to thousand parts of the residue from a wine dreg distillation, having a moisture content of about 75% and containing about 50 parts of potassium bitartrate and about 10 parts of calcium tartrate while maintaining a temperature of about 60° C.; thereafter adding under stirring lime leach to the thus-formed reaction mass in such quantity and concentration as to substantially neutralize said reaction mass, thereby forming calcium tartrate; continuing agitation of said mass for approximately four hours, thereby allowing crystals of calcium tartrate to grow to a size sufficient to permit separation of the same from the remainder of said mass by wet classification; and subjecting the thus treated mass to wet classification, whereby said calcium tartrate crystals are substantially separated from the remainder of said mass.

References Cited in the file of this patent
UNITED STATES PATENTS 2,303,602    Braun ------------------ Dec. 1, 1942